United States Patent Office 3,413,088
Patented Nov. 26, 1968

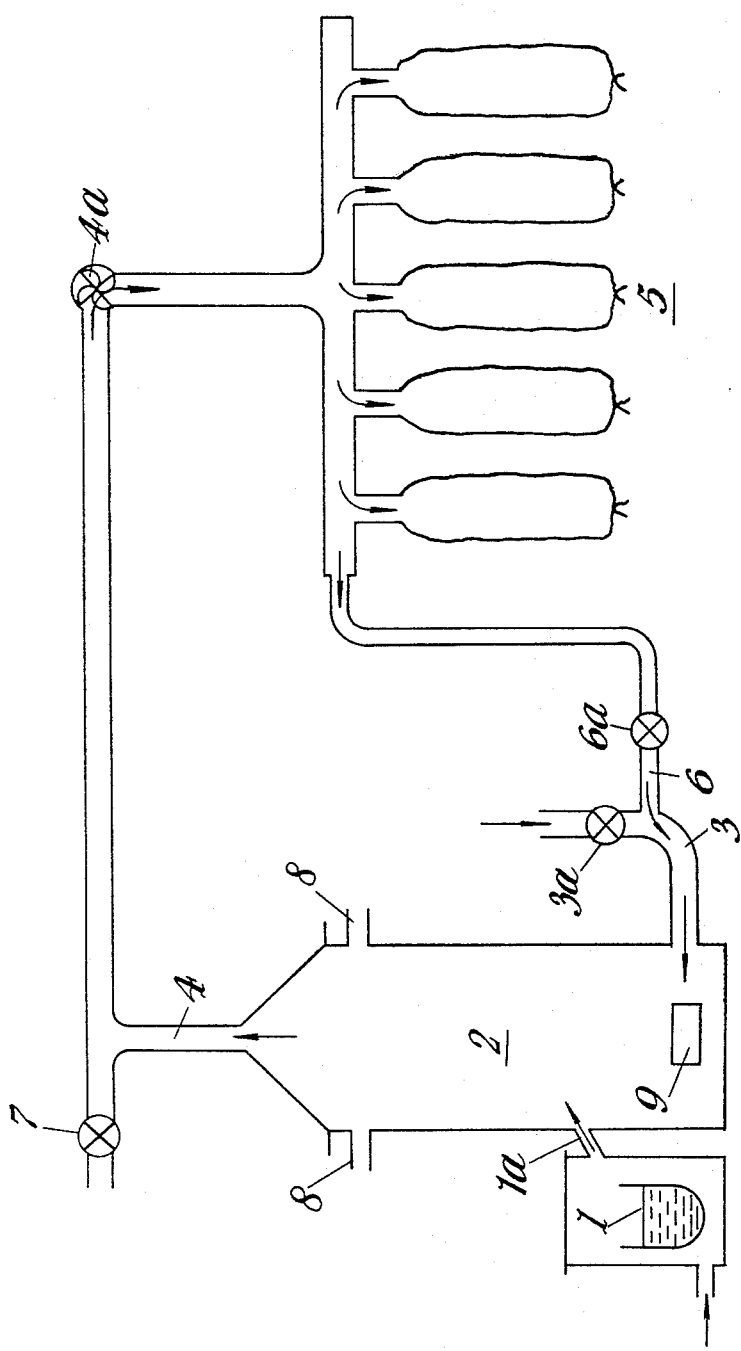

3,413,088
PRODUCTION OF ZINC OXIDE
Leslie Jack Derham and John Marriott, Avonmouth, England, assignors to Imperial Smelting Corporation (N.S.C.) Limited
Filed Apr. 3, 1964, Ser. No. 357,232
Claims priority, application Great Britain, Apr. 5, 1963, 13,598/63
6 Claims. (Cl. 23—148)

ABSTRACT OF THE DISCLOSURE

The invention disclosed is a one-stage process for the production of zinc oxide. A few simple controls may be adjusted to give zinc oxide with a predetermined mean particle size. To this end a continuous supply of zinc vapour is burned using a continuous supply of an oxygen-containing gas, such as air, the hot gas and zinc oxide suspension so formed is continuously drawn off, and a proportion of the suspension is continuously recycled to provide nuclei for further grain growth.

---

This invention relates to the production of zinc oxide and is especially concerned with the production of zinc oxide with photoconductive properties.

One known process for producing zinc oxide uses straightforward evaporation and oxidation of zinc vapour and needs zinc of 99.99% purity. Another known process uses zinc of a lower purity but a vapour purification stage is included so that the vapour oxidised is of 99.99% purity.

Photoconductive zinc oxide is used in the production of sensitised paper for photocopying. As well as being photoconductive, such zinc oxide should be of the correct particle size, and give good dispersion low oil or vehicle absorption and be capable of giving a good matte finish to the treated paper. In practice it has been found that particle size (or more exactly, particle size range) is a key quality since if the particle size of such a photoconductive oxide is correct then the other qualities (dispersion, oil absorption, etc.) will also be suitable.

Known methods, unless followed by grading of the zinc oxide, produce zinc oxide with a mean particle size lying in the range $0.2\mu$ to $0.3\mu$ (here and throughout particle sizes are measured by the air permeability method). However, we have discovered that the best particle size range for photoconductive work is from $0.35\mu$ to $0.45\mu$, although other size ranges may be used in special applications.

The present invention provides a simple continuous one-stage process for the production of zinc oxide which by adjustment of a few simple controls can give zinc oxide with any required mean particle size, this mean particle size being within the range $0.1\mu$ to $0.7\mu$. Thus oxides for photoconductive work can be produced with a mean particle size in the range $0.35\mu$ to $0.45\mu$, or smaller oxides can be made for other purposes.

The invention consists in a process for producing zinc oxide in which a continuous supply of zinc vapour is burned in a reaction zone using a continuous supply of an oxygen-containing gas, preferably air. The hot gas/zinc oxide suspension so formed is continuously drawn off, and a proportion of the suspension is continuously recycled to provide nuclei for further grain growth.

Preferably, the hot gas/zinc oxide suspension recycled is passed into the continuous supply of oxygen-containing gas while still hot, thereby not only providing nuclei for further grain growth but also serving to preheat the supply of oxygen-containing gas.

That proportion of the suspension which is not recycled may of course be treated in any convenient fashion, e.g. with bag filters, to remove and collect the zinc oxide.

In that preferred embodiment of the process in which a photoconductive zinc oxide is prepared, the continuous supply of zinc vapour should be 99.99% purity.

Preferably, parameters such as rate of zinc vapour supply, rate of oxygen-containing gas supply, and proportion of suspension recycled should be carefully controlled to give a product of a narrow range of particle size. This may be done, e.g. by adjusting the boiling rate of a vessel of molten zinc for supplying zinc vapour or by operating controls on the primary gas and recycle inlets.

The invention further consists in zinc oxide, produced by the process described in the four preceding paragraphs.

The known methods of zinc oxide production usually give an oxide with a particle size range lying between $0.2\mu$ and $0.3\mu$. The method described herein however, allows a zinc oxide of any desired particle size range to be produced, the preferred range of photoconductive work being from $0.35\mu$ to $0.45\mu$. Zinc oxides of other particle size ranges may be prepared for other uses by this same method. Thus the invention provides a simple means of producing a "tailor-made" zinc oxide for any purpose.

The invention still further consists in apparatus for producing zinc oxide, comprising a reaction chamber for burning zinc vapour provided with an inlet for zinc vapour; an inlet for an oxygen-containing gas such as air; an outlet for the suspension of zinc oxide in hot gas which is produced; and a duct for conveying a proportion of this hot suspension to an inlet into the reaction chamber.

Preferably, the duct is such that the hot suspension may pass, while still hot, into the inlet for the oxygen-containing gas.

Means such as bag-filters may be provided to collect the zinc oxide which is produced. For controlling the particle size controls may be inserted at the oxygen-containing gas inlet and the recycle inlet.

The invention will be further described with reference to the accompanying single figure of diagrammatic drawing, which is especially applicable to the production of a photoconductive oxide.

In this drawing, 1 shows a supply of zinc vapour of 99.99% purity which may be, for example, a vessel in which molten zinc is boiled to produce zinc vapour. 2 is a refractory-lined chamber provided with inlet 1a for zinc and inlet 3 for admitting air at a rate controlled by damper 3a and outlet 4 through which the combustion products are drawn by fan 4a. The outlet 4 is connected by bag-filter 5 and to inlet 6 leading into inlet 3 over valve 6a.

In operation, a suspension of zinc oxide in hot air is produced in the reaction zone of chamber 2 and passes to the bag-filter 5, except for a proportion which is passed into air inlet 3, thus providing nuclei for further grain growth and some preheat for the combustion. This preheat also has an effect on the size and shape of the zinc oxide particles produced in the chamber.

Secondary air inlets (8) are provided near the top of the combustion chamber (2) and a further air inlet is supplied at (7) in order that air may be drawn in to keep the larger particle-size oxide in suspension in the duct leading to the fan. An aperture (9) near the bottom of the chamber (2) is also provided for cleaning out.

The operation and the particle size of the resulting oxide can be adjusted to within relatively narrow limits by:

(a) Rate of zinc vapour supply, e.g. rate of boiling of zinc.

(b) Proportion of hot ZnO/air suspension in the air supply. (In certain circumstances, however, a good grade of oxide, can be produced without any recycling).

(c) Rate of primary air supply.

(d) Temperature in the reaction chamber (this depends to some extent on the amount of reaction in a given time, i.e. upon (a), (b) and (c), but can also be separately controlled).

If the ratio of volumes, primary air/zinc vapour is increased, then a smaller oxide will result and vice versa. The main factors determining the size of the oxide produced are:

(1) Temperature within the combustion chamber, and
(2) Retention time of the oxide particles within the chamber.

Thus, if the retention time is increased, e.g. by reducing the air flow, then a larger oxide will result. If the temperature within the combustion chamber is increased, e.g. by increasing the zinc boiling rate, again a larger oxide will result.

As examples of the sizes of oxide which can be produced by the method according to the invention the following figures are quoted by way of example (1) Mean particle size in range 0.18 to 0.22$\mu$:
  Combustion chamber temperature _ 75° C.–100° C.
  Recycle volume _____ Nil.
  Total volume of baghouse _____ 250–300 c.f./m.
  Zinc boiling rate _____ 18–20 lbs./hour.

(2) Mean particle size in range 0.25 to 0.35$\mu$:
  Combustion chamber temperature _ 200°–220° C.
  Recycle volume (approx.) _____ 75 c.f./m.
  Total volume to baghouse _____ 250–300 c.f./m.
  Zinc boiling rate _____ 20 lbs./hour.

(3) Mean particle size in range 0.45 to 0.55$\mu$:
  Combustion chamber temperature _ 250°–270° C.
  Recycle volume _____ 75 c.f./m.
  Total volume to baghouse _____ 250–300 c.f./m.
  Zinc boiling rate _____ 25 lbs./hour.

The above figures which were taken from a pilot plant are not meant to be limiting and as will be appreciated on so small a plant such figures are not easily measured. They are simply meant as an indication of the effect of varying different controls.

The addition of other chemical substances, either to the boiling metal, or into the combustion zone may be found to be advantageous in the production of oxides for special purposes and having special properties.

Various modifications may be made within the scope of the invention.

We claim:

1. A process for producing zinc oxide, comprising the steps of: supplying a regulated amount of zinc vapour continuously to a reaction zone; supplying a controlled amount of primary oxygen-containing gas continuously to the reaction zone, wherein the zinc vapour is oxidized to zinc oxide in suspension; drawing off continuously the resulting hot gas-zinc oxide suspension; separating a regulated proportion of this suspension; admixing the thus separated proportion of zinc oxide in suspension, in its heated state, with the continuously supplied primary oxygen-containing gas just prior to the supply thereof to the reaction zone, whereby it acts as a preheat for the primary oxygen-containing gas and is then conveyed in the said gas to the reaction zone as a suspension to provide nuclei for further grain growth of zinc oxide particles.

2. A process as claimed in claim 1 in which the particle size is controlled by controlling the boiling rate of a vessel of molten zinc supplying the zinc vapour.

3. A process as claimed in claim 2 in which the particle size is controlled by controlling the supply of oxygen-containing gas.

4. A process as claimed in claim 2 in which the particle size is controlled by controlling the proportion of suspension recycled.

5. A process as claimed in claim 2 in which the particle size is controlled by controlling the temperature at which the reaction is carried out.

6. Method according to claim 1, in which at least one stream of secondary oxygen-containing gas is admixed with all of the suspended zinc oxide leaving the reaction zone to keep the larger particles of zinc oxide in suspension.

References Cited

UNITED STATES PATENTS

| | | | |
|---|---|---|---|
| 1,372,486 | 3/1921 | Coursen | 23—148 |
| 1,522,097 | 1/1925 | Breyer et al. | 23—148 |
| 2,331,599 | 10/1943 | Cyr | 23—148 |
| 2,941,862 | 1/1960 | Cyr et al. | 23—148 |
| 3,060,134 | 10/1962 | Elder et al. | 96—1.8 |
| 3,107,169 | 10/1963 | Bornarth | 96—1.8 |
| 920,336 | 5/1909 | Hughes | 23—148 |

OTHER REFERENCES

N. B. Hannay, Semiconductors, 1959, pages 132 to 134, Reinhold Publishing Corp., New York—Copy in Group 110 (QC 611 H32 C.2).

OSCAR R. VERTIZ, *Primary Examiner.*

B. H. LEVENSON, *Assistant Examiner.*